Dec. 2, 1969 M. B. CLARK 3,481,853
METHOD AND APPARATUS FOR CLEANING FUEL CELL ELECTROLYTES
Filed Aug. 31, 1966
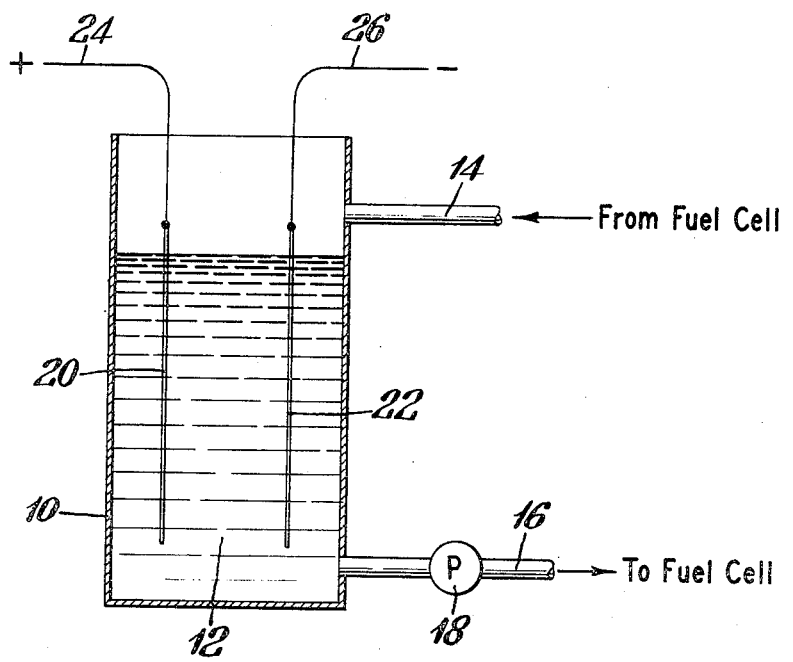
INVENTOR
MILTON B. CLARK
BY
ATTORNEY

United States Patent Office 3,481,853
Patented Dec. 2, 1969

3,481,853
METHOD AND APPARATUS FOR CLEANING FUEL CELL ELECTROLYTES
Milton B. Clark, North Royalton, Ohio, assignor to Union Carbide Corporation, a corporation of New York
Filed Aug. 31, 1966, Ser. No. 576,315
Int. Cl. B01k 3/02; H01m 27/12; C01d 7/34
U.S. Cl. 204—186                                        5 Claims

ABSTRACT OF THE DISCLOSURE

Impurities are removed from aqueous fuel cell electrolytes by means of auxiliary electrodes disposed in the electrolyte enclosure. A voltage is applied across the auxiliary electrodes which is large enough to precipitate impurities but small enough to avoid gas bubble formation.

---

This invention relates to fuel cells. More particularly, the invention is directed to a method and apparatus for cleaning aqueous electrolytes used in fuel cells.

Fuel cells generally comprise an electrolyte and two electrodes in contact with the electrolyte for electrochemically reacting a fuel (supplied to the fuel electrode) and an oxidant (supplied to the oxidant electrode) with output of electric current. Fuel cells which use a wide variety of both acid and alkaline aqueous electrolytes have been known for many years. A persistant problem with such fuel cells, particularly fuel cells using air or oxygen as the oxidant, has been the accumulation of undesirable impurities in the electrolyte, which impurities form solid deposits within the fuel cell. The problem is particularly serious when the deposits form on the fuel cell electrodes, thus interfering with electrochemical activity, or when the deposits form in the electrolyte conduits, thus causing restriction of electrolyte flow and sometimes complete plugging of the conduits.

The methods heretofore used to reduce the amount of solid deposits forming from aqueous fuel cell electrolytes have included filters, ion exchange resins, and the use of electronegative metals (such as zinc and cadmium) as scavengers for some of the impurities. These methods have been able to reduce slightly the rate of deposit formation, but have never been able to eliminate such deposits where fuel cells must remain in service for extended periods of time.

It is an object of the present invention to provide a method and apparatus for cleaning fuel cell electrolytes. Another object of the invention is to prevent the formation of solid deposits from aqueous fuel cell electrolytes. Another object of the invention is to provide a method and apparatus particularly suitable for preventing formation of solid deposits from aqueous alkaline electrolytes where the electrolytes are circulated through fuel cell batteries.

In the drawings:

The single figure is a schematic drawing of one embodiment of the present invention.

The method of this invention comprises placing in the aqueous electrolyte of a fuel cell at least one pair of spaced auxiliary electrodes, these electrodes being constructed from material which is inert to the electrolyte, and applying across these electrodes a voltage greater than the minimum potential at which at least one of the impurities in the electrolyte precipitates on the electrodes but less than the potential which causes substantial gas bubble formation at one or more of the electrodes.

The apparatus of this invention is an improvement over conventional fuel cells employing aqueous electrolytes, and comprises at least one pair of inert, spaced auxiliary electrodes located within the electrolyte enclosure of the fuel cell, together with means for applying across these electrodes a voltage which can be as high as the potential which causes substantial gas bubble formation at one or more of the electrodes.

In a preferred embodiment of the method and apparatus of this invention, the auxiliary electrodes for cleaning the electrolyte are placed in an electrolyte reservoir which is connected to the fuel cell or fuel cell battery by means of appropriate conduits and means for circulating the electrolyte through the reservoir-fuel cell system. This embodiment is illustrated in the drawing. An electrolyte reservoir 10 containing electrolyte 12 is connected to a fuel cell or fuel cell battery by conduits 14 and 16. A pump 18 circulates electrolyte through the system. Two inert spaced auxiliary electrodes 20 and 22 are located in the electrolyte in compartment 10. Contacts 24 and 26 lead from the electrodes to a voltage source (not shown).

The exact composition of the solid deposits which precipitate from fuel cell aqueous electrolytes is not known. The deposits are generally brown or black in color and often contain as metallic constituents iron, platinum, palladium, manganese, cobalt, chromium and copper.

When the method and apparatus of this invention are employed, undesirable soluble components, which would precipitate from the fuel cell electrolyte, deposit preferentially on the auxiliary electrodes of this invention rather than at other locations within the fuel cell system. The deposit accumulates on both the positive and negative auxiliary electrodes, and the constituents of the deposits can generally be traced to the materials used in fuel cell electrode fabrication and in other portions of the fuel cell system. The impurities in the electrolyte can thus be substances present in the electrolyte prior to use in the fuel cell and/or substances which dissolve in the electrolyte as the electrolyte comes in contact with the fuel cell electrodes and the other materials used in constructing the fuel cell, its container and auxiliary equipment.

The auxiliary electrodes used in this invention can be constructed from any conductive material which is substantially inert to the electrolyte in which the electrodes are immersed. For example, electrodes for use in alkaline electrolytes can be constructed from nickel, nickel alloys, platinum or graphite, while electrodes for use in acid electrolytes can be constructed from tantalum, titanium, graphite or platinum.

The auxiliary electrode size and shape is not critical provided that the electrodes are sufficiently large to provide ample space for deposit of impurities thereon. Thus, the auxiliary electrode size will be approximately proportional to the electrolyte volume and the anticipated impurity content of the electrolyte.

The auxiliary electrode shape is also not critical, and flat electrodes, rod shaped electrodes and electrodes in the form of screens can all be used. The space between the electrodes can be merely physical separation in the electrolyte or can be non-conductive spacer materials, for example, non-conductive plastic materials which are inert to the electrolyte. A particularly useful electrode configuration comprises nickel screens rolled into the form of concentric tubes and separated from one another by a plastic separator between the two screens.

The voltage applied to the auxiliary electrodes of this invention should be high enough to cause precipitation on the electrodes of at least one of the impurities in the electrolyte. Thus, the minimum voltage required will vary depending upon the particular system involved. The upper limit of the voltage to be applied is determined by the voltage at which significant bubble formation takes place on the auxiliary electrode surfaces. Such bubble formation inhibits deposition of impurities on the electrode so that solid particles accumulate first in the vicinity of the electrodes and can then be transported to other portions of the system. Theoretically, the voltage at which bubble formation will take place is about 1.23 volts, that is, the decomposition voltage of the water in the aqueous electrolyte. However, some over-voltage is generally necessary to obtain decomposition of the water and, accordingly, significant bubbling is seldom observed at applied voltages of 1.4 volts or below.

Any convenient low voltage source can be employed to apply the voltage across the auxiliary electrodes of this invention. Most convenient are conventional single cell dry cell batteries. Such batteries have a nominal initial voltage of about 1.45 volts, and some bubbling at the electrodes has been observed when the battery is first connected. However, the voltage soon drops to 1.4 volts or below, and no bubbling occurs thereafter. This small amount of bubbling does not adversely affect the performance of the auxiliary electrodes in this invention.

Alternatively, the necessary voltage for the auxiliary electrodes of this invention can be obtained from the fuel cell itself. However, when the fuel cell is used as the voltage source, it is preferable to have the auxiliary electrodes of this invention isolated from the fuel cell by means of, for example, an oscillator or alternator.

The current between the auxiliary electrodes of this invention is generally in the order of 100 to 300 milliamperes with applied voltages on the order of 0.8 to 1.4 volts, a requirement which can be easily supplied by conventional dry cell batteries.

In a specific example of the process and apparatus of this invention, life tests were made on a series of eight cell hydrogen-air fuel cells employing as the electrolyte 12 normal aqueous potassium hydroxide at 65° C. These fuel cell batteries were capable of supplying 100 watts output at 6 volts. The electrolyte reservoir was external to the fuel cell stack and was connected to the fuel cell stack by means of a small circulating pump and conduits as indicated schematically in FIGURE 1. The auxiliary electrodes of this invention, which were placed in the electrolyte reservoir, comprised two nickel screens each 6 inches square and separated by a polypropylene mesh. The nickel screens and polypropylene separator were rolled to provide a pair of concentric electrodes, the outer diameter of the roll being about one inch. A standard commercial dry cell battery with an initial voltage of about 1.4 volts was connected across the electrodes. The batteries thus equipped with the auxiliary electrodes operated for periods as long as 3000 hours with no visible deposition of foreign material in the electrolyte conduits, but with considerable accumulation of solid deposits on the nickel screen electrodes.

Identical fuel cell batteries which were operated without the auxiliary electrodes of this invention experienced considerable trouble due to plugging of small orifices in the fuel cell system and plugging of the electrolyte conduits, often leading to shut-down of the entire system. Such shutdowns due to impurity deposits often occurred in periods as short as 168 hours.

What is claimed is:

1. In a fuel cell comprising an aqueous electrolyte and two fuel cell electrodes in contact therewith for electrochemically reacting a fuel and an oxidant, the improvement which comprises: at least one pair of inert spaced auxiliary electrodes for removing impurities from said electrolyte located within the electrolyte enclosure of said fuel cell, and means for applying across said auxiliary electrodes a voltage greater than the minimum potential at which at least one of the impurities in said electrolyte precipitates on said auxiliary electrodes, but less than the potential which causes substantial gas bubbles formation at one or more of said auxiliary electrodes.

2. The apparatus in accordance with claim 1 wherein said applied voltage is less than about 1.4 volts.

3. The apparatus in accordance with claim 2 wherein said auxiliary electrodes are located in an electrolyte reservoir external to said fuel cell system.

4. The process for removing from fuel cell electrolyte impurities capable of forming solid deposits which comprises: placing in the aqueous electrolyte of a fuel cell as defined in claim 1 at least one pair of spaced auxiliary electrodes, said electrodes being constructed from material which is substantially inert to said electrolyte; and applying across said electrodes a voltage greater than the minimum potential at which at least one of the impurities in said electrolyte precipitates on said auxiliary electrodes, but less than the potential which causes substantial gas bubble formation at one or more of said auxiliary electrodes.

5. The process in accordance with claim 4 wherein said electrolyte is an alkaline electrolyte and said applied voltage is less than about 1.4 volts.

References Cited

UNITED STATES PATENTS

| 2,270,376 | 1/1942 | Ladd | 204—153 |
|---|---|---|---|
| 3,244,605 | 4/1966 | Hotchkiss | 204—153 |
| 3,322,574 | 5/1967 | Justi et al. | 136—86 |
| 3,338,746 | 8/1967 | Plust et al. | 136—3 |

JOHN H. MACK, Primary Examiner

T. TUFARIELLO, Assistant Examiner

U.S. Cl. X.R.

136—86; 204—130, 231